United States Patent [19]

Tidemalm et al.

[11] 4,158,324
[45] Jun. 19, 1979

[54] HYDRAULIC CYLINDER ASSEMBLY FOR POSITIONING AN ARTILLERY BARREL

[75] Inventors: Gustav H. Tidemalm; Björn E. Vidinghoff, both of Karlskoga, Sweden

[73] Assignee: AB Bofors, Bofors, Sweden

[21] Appl. No.: 810,466

[22] Filed: Jun. 27, 1977

[51] Int. Cl.² ............................................ F41F 21/08
[52] U.S. Cl. .................................................... 89/41 H
[58] Field of Search ....................................... 89/41 H

[56] References Cited

U.S. PATENT DOCUMENTS

| 2,946,262 | 7/1960 | Bruehl | 89/41 H |
| 3,952,632 | 4/1976 | Eriksson et al. | 89/41 H |

Primary Examiner—Stephen C. Bentley
Attorney, Agent, or Firm—Pollock, Vande Sande & Priddy

[57] ABSTRACT

The present invention relates to a pair of hydraulically operated cylinder assemblies adaptable for positioning the barrel of an artillery weapon and including novel hydraulic dampening assemblies for controlling the speed of movement of the barrel.

9 Claims, 8 Drawing Figures

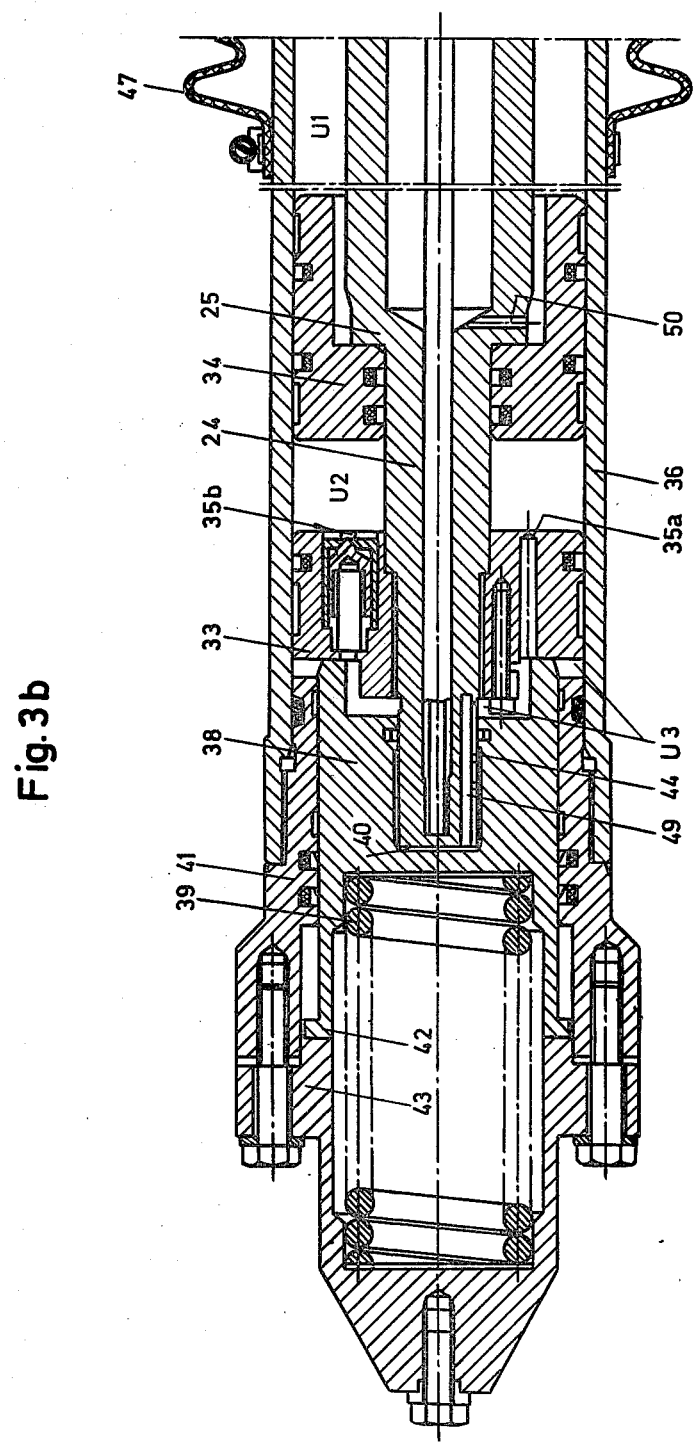

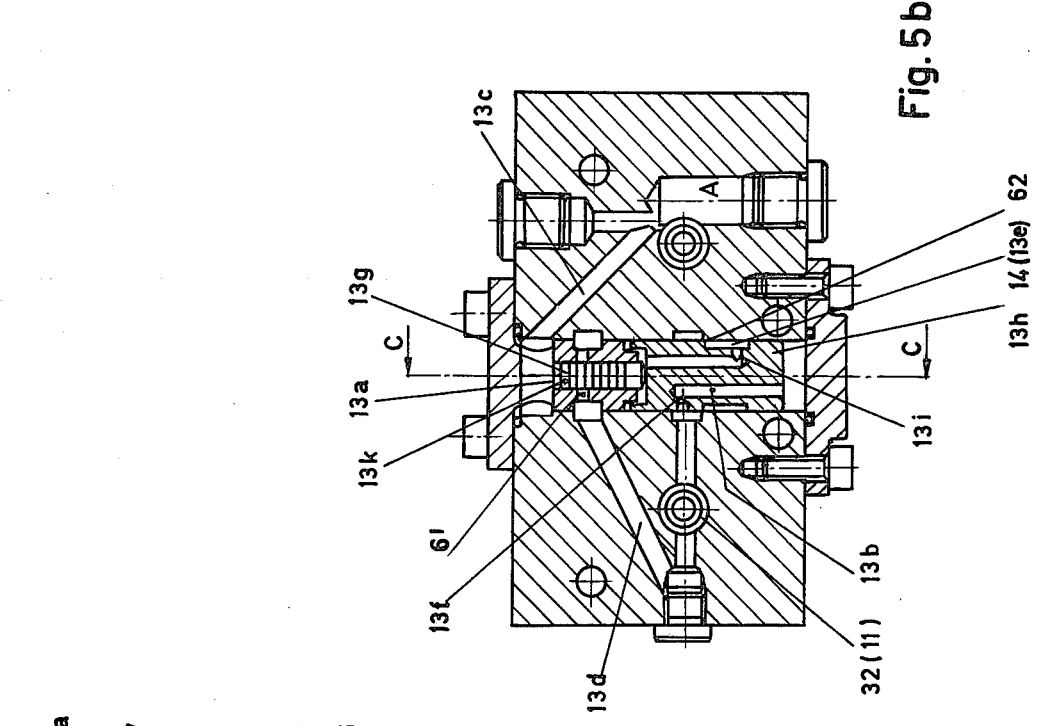
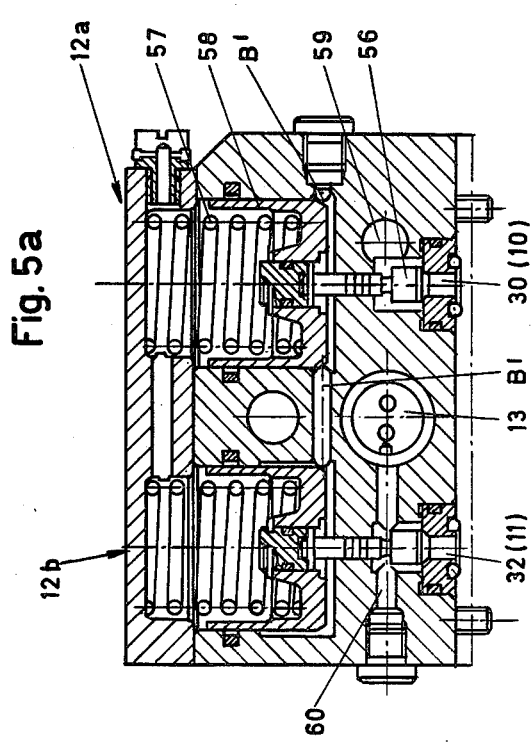
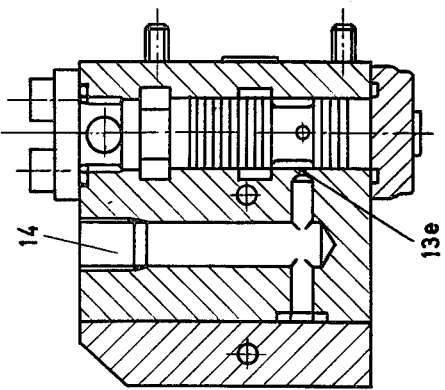

HYDRAULIC CYLINDER ASSEMBLY FOR POSITIONING AN ARTILLERY BARREL

BACKGROUND OF THE INVENTION

The present invention relates to a device for use with an elevating cylinder of a gun barrel. The cylinder comprises two telescopically arranged parts, of which a first part is connected to a mounting or the like and a second part is connected to the gun barrel. One of the telescopic parts is provided with a piston unit which can be exposed to a medium, for instance hydraulic fluid, causing the first and second parts to be displaced longitudinally in relation to each other.

For reasons of weight, it is desirable in firearms, such as large calibre field-artillery guns (e.g. 105–155 mm), to have damping devices which are light weight and of simple design, but which nevertheless fulfill the requirements for proper functioning and efficient damping of the upward jumping movements of the barrel which occur during firing.

In order to solve the problems, associated with known devices it has previously been proposed to utilize inter alia mechanical damping devices which, however, have proven to be comparatively heavy, require excessive space, and are comparatively expensive.

The device according to the present invention is based upon the knowledge that hydraulic damping is advantageous, particularly from the point of view of weight.

SUMMARY OF THE PRESENT INVENTION

A feature of a device formed according to the invention is that the piston unit comprises a fixed piston and a piston arranged at the fixed piston. Furthermore, a telescopic part is movable a certain extent in the longitudinal direction of the telescopic parts and the fixed and the movable pistons are arranged to dampen the upward jumping movements of the barrel which may take place during firing operations.

In addition to a desired economic, light and efficient damping function, the proposed embodiments also provide other advantages, and as examples of these advantages, it is noted that the damping function together with a special pressure distribution valve which distributes the pressure of the medium on the upper and under sides of the piston unit in a predetermined way make it possible to fire the weapon with open blocking valves, which in turn, involves that the firearm itself permits firing in direct connection with target tracking. Also the aiming function is simplified, due to the good recuperating capability of the firearm, and need not be especially compensated for by a gun layer.

The new device provides a further advantage in that it permits running with the maximum elevating velocity to the fully elevated position. Through coaction between the movable or floating piston and a lower piston on the outer telescopic part and through the choice of certain areas, due to the weight caused by the unbalance in the suspension of the barrel, the barrel will fall back to the fully elevated position as soon as this has been passed.

Through specific coaction with a compensation piston, tensional forces due to temperature related expansion in the medium used are eliminated when the barrel is in the clamped position.

Features that can be considered indicative of a device formed according to the invention described in the following specification and defined in the accompanying claims.

BRIEF DESCRIPTION OF THE DRAWINGS

A preferred embodiment of the present invention will be described in the following, with reference to the accompanying drawings, in which

FIGS. 3a–3b each show a longitudinal section of a hydraulic cylinder assembly adaptable for use in the embodiment of FIG. 1 (FIGS. 3a and 3b should appropriately be placed together when viewing them);

DETAILED DESCRIPTION OF A PREFERRED EMBODIMENT

Figure 1:
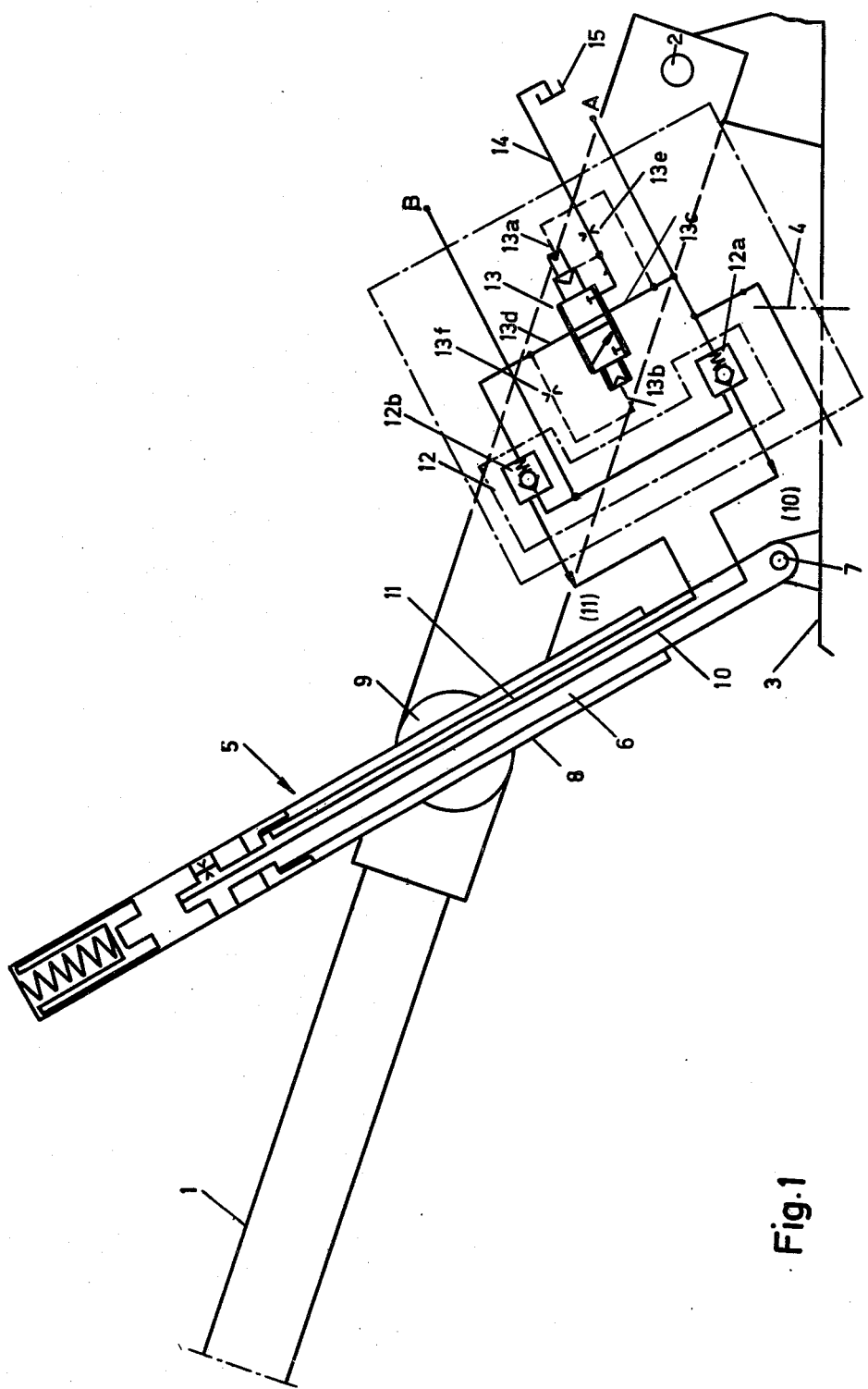
FIG. 1 shows a view from the side and partly in diagrammatic form an elevating cylinder formed according to the invention.

In FIG. 1, the numeral 1 designates a barrel which is elevatably supported at one end on a conventional trunnion 2, with the supporting device for the barrel is arranged on an upper mounting 3 which, in turn, is traversely rotatable around a centre axis 4. The barrel 1 and upper mounting 3 are arranged on an artillery weapon, for instance a field artillery weapon, which can be of a conventional type. The barrel 1 can have a calibre of, for example, 155 mm.

To perform the elevating function, the barrel is provided with two elevating cylinders 5, one on each side, of which only one is shown in FIG. 1. Each elevating cylinder is made with two telescopically arranged parts, of which the first telescopic part 6 has a free end rotatably secured to the upper mounting 3 in a similar way as the barrel. The telescopic first part 6 is supported on a further supporting journal 7, so that the part 6 can be tilted in the plane of the paper in FIG. 1, while at the same time following the traversing movements of the upper mounting in 3. The second telescopic part 8 is supported in a spherical support 9 of barrel 1, with the support shown in FIG. 1 being positioned at a central section of the centre part.

The displacement of the first and second telescopic parts 6 and 8 in relation to each other in the respective elevating cylinder 5 takes place with the aid of hydraulic fluid, which has the result that, in principle, the barrel will rest upon a column of hydraulic fluid in the elevating cylinder. The suspension shown for the barrel involves that there is an unbalance in the barrel for the elevation movements, i.e. the actuating force for the elevation is dependent on the angle of elevation.

The inner, or first telescopic part 6 is provided with a piston unit which will be described in more detail in the following, and the elevating cylinder 5 is moreover provided with first and second connection channels 10 and 11 for hydraulic fluid (or a corresponding medium).

At the connection with channels 10 and 11, a blocking valve 12 is arranged, with blocking valve elements 12a and 12b for the first and second connection channels, respectively, and also including a pressure distribution valve 13, consisting of a three-way hydraulic pressure control valve. The first connection channel 10 is connected via the first blocking valve element 12a to a source of operating pressure provided at point A. The second connection channel 11 is connected to the second blocking valve element 12b and the pressure distribution valve 13, which has two control inlets 13a and 13b and two connections 13c and 13d for the passage of a medium. The control inlet 13a is then connected to the operating pressure via the connection A, and the control inlet 13b is connected via the second blocking valve element 12b and a constriction 13f so that it senses the pressure on the under side of the piston unit. The connection 13c on the pressure distribution valve is connected in parallel with the first blocking valve element 12a to the operating pressure provided at point A.

At a drain pipe 14 the pressure distribution valve is provided with a further constriction 13e. The purpose of the pressure distribution valve is to ensure that there is a predetermined relationship between the hydraulic fluid pressure on the upper and under sides of the piston units, and it is therefore arranged so that, depending on the operating pressure and the existing pressure on the under side of the piston unit, it will connect the second connection channel either to the operating pressure or to a tank 15 via the drain pipe 14. The blocking valve 12 is connected to an operating pipe via a point B so that it is possible to connect or disconnect a pressure to the blocking valve for opening or closing of the blocking valve elements 12a and 12b. The blocking valve elements are intended to be opened to elevate or depress the barrel, and are intended to be closed to provide fixed elevation or depression positions, for the barrel 1 and also when the barrel is in the clamped position. The arrangement shown with blocking and distribution valves permits firing with open blocking valves, which is essential for efficient target tracking.

Figure 2:
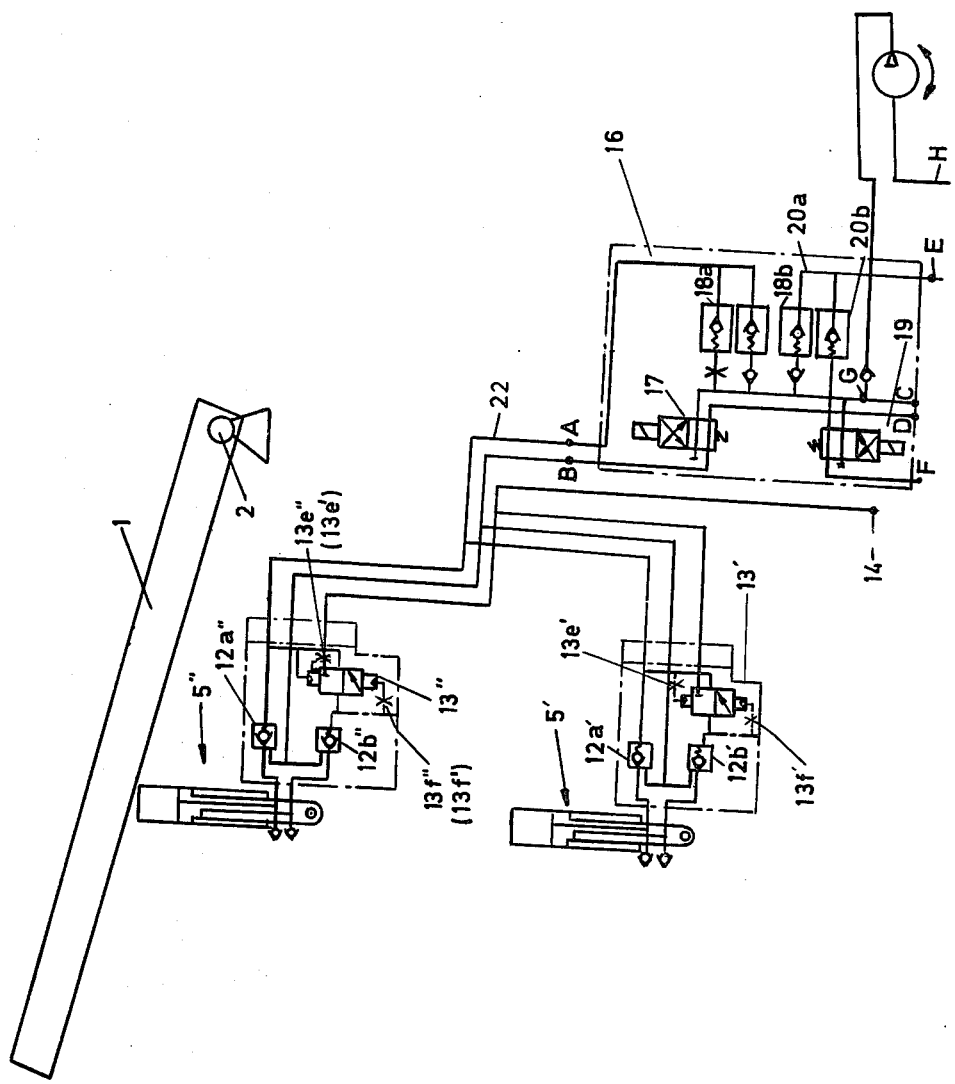
FIG. 2 shows a diagram of the components comprising a field-artillery weapon formed according to the present invention.

FIG. 2 is intended to show the complete operating equipment for the two elevating cylinders 5' and 5" necessary for elevating the barrel 1, which are provided with identical equipment as regards the blocking valve elements 12a', 12b' and 12a" and 12b", respectively and the pressure distribution valve 13' and 13" respectively, with the constrictions 13e' and 13e" and 13f' and 13f". An operating unit 16 is also included, which is common for both the elevating and traversing functions of the gun in question. The operating unit 16 comprises a first operating valve 17 and a first control valve 18a, 18b for the elevation control. The traversing control system comprises a second operating valve 19 and a second control valve 20a, 20b. In FIG. 2, the connection points A and B positioned according to FIG. 1 are also indicated. There is also a point C indicated, which is connected to the system pressure in a hydraulic system, not shown in detail, for the field-artillery weapon in question. The connection point C, like the drain pipe 14, is connected to a tank, not shown, in the hydraulic system. The draining to the tank takes place via filters and, possibly, coolers in the system. The connection points E and F are connected to directing members, not shown, in the traversing equipment. A hand pump 21 is also indicated, by means of which the elevating and traversing can be carried out manually if the pressure in the system should be lost. Said hand pump is connected to the system pressure pipe at a point G, and to said tank via a point H.

During elevation and depression, in accordance with the above, the blocking valves 12a', 12b' and 12a", 12b", respectively, are open. Opening takes place through actuation of the operating valve 17 from the position shown in FIG. 2. During actuation, the system pressure is connected to the operating pipe of the blocking valve. Elevation or depression then takes place by means of a control lever on the control valve 18a, 18b with the operating pressure obtained from the control valve being allowed to act directly on the upper side of said piston unit. The pressure distribution valve 13', 13" achieves that the relation between the pressure of the medium on the upper and under sides of the piston unit are, for instance, 1:8 during depression and a stationary barrel. At elevation of the barrel, however, the pressure relation is varied on the upper and under sides of the piston unit with the aid of the constriction 13e', 13e". The variation is dependent on the elevating velocity. The greater the velocity, the more the pressure relation will approach 1:1. At the sudden jumping movements upwards which occur in the barrel when firing when the blocking valve elements are open, the pressure distribution valve 13 disengages the pressure distribution function by closing the drain pipe 14. Due to the unbalance in the suspension of the barrel, the speed of said jumping movement upwards is dependent on the angle of elevation at which the firing takes place. The higher the angle of elevation the greater the speed of the jumping movement upwards of the barrel. The function of the pressure distribution valve can then be chosen so that closing of the drain pipe 14 does not take place when firing at low angles of elevation, but the pressure relation assumes values closer to 1:1. The pressure distribution valve also ensures that there will never be an under-pressure on the under side of the piston unit, and thereby prevents air release from the fluid.

The arrangement shown with pressure distribution and control valves also involves that the hydraulic fluid can be conducted to and from the upper side of the piston unit via one and the same pipe 22. Elevation takes place by filling in hydraulic fluid and depression by draining off hydraulic fluid via said pipe 22. Filling and draining takes place by means of the control valve 18a, 18b, with which also the aiming velocity is determined. The function of the control valve will be described in more detail in the following. Blocking of the blocking valves takes place by moving the operating valve back to the position shown in FIG. 2.

Traversing takes place in the corresponding way as elevating, but with the difference that the system pressure gives a counter-pressure on a so-called small area on the traversing cylinder.

Figure 3A:
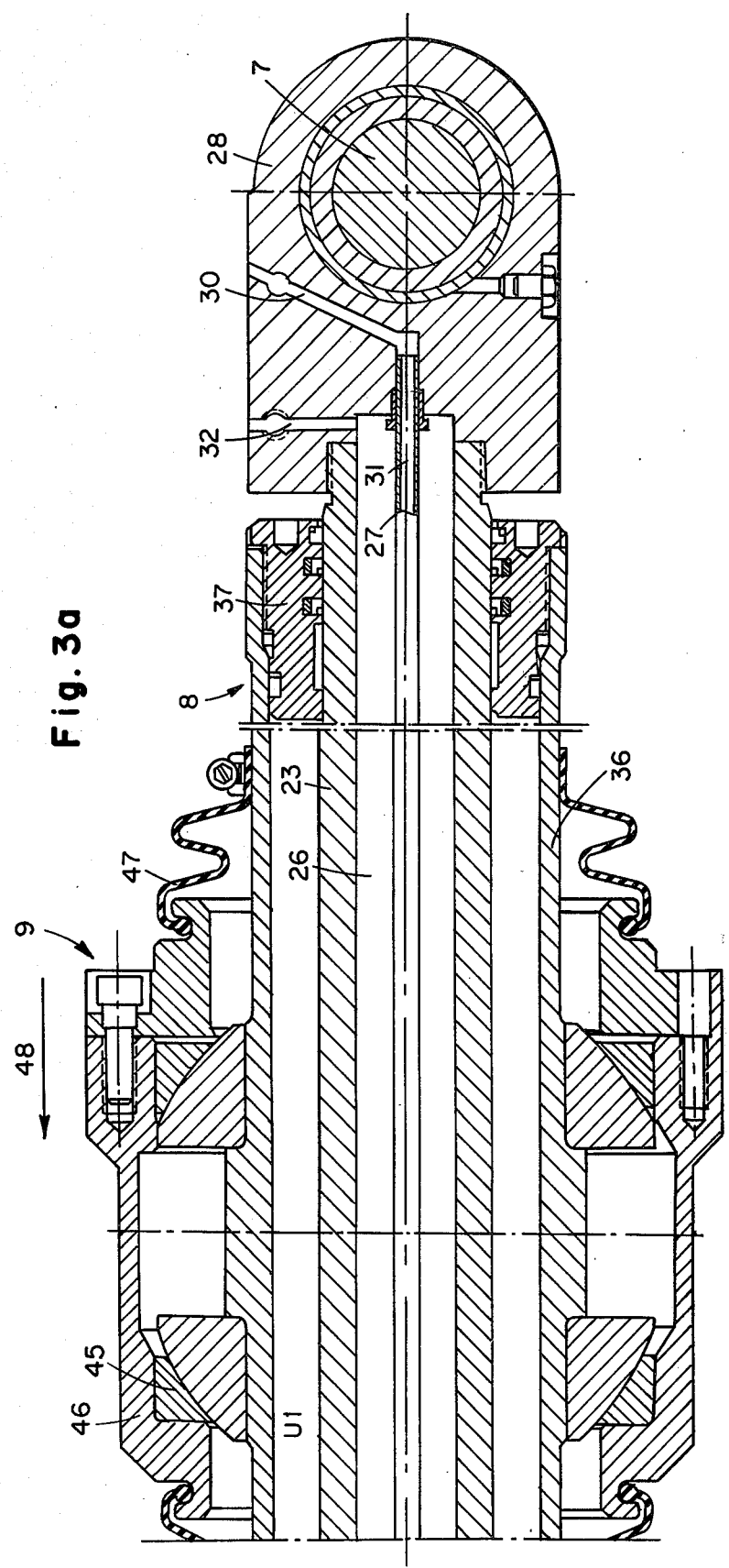

As shown in FIGS. 3a and 3b, which should appropriately be viewed with their ends placed together, the first telescopic part comprises a pipe 23, at the top of which there is a tapered section 24, which starts with a pronounced shoulder 25. The pipe has a through hole, which extends through the centre of the pipe in the longitudinal direction thereof. The first section 26 of the hole has a larger diameter than the second section which, in principle, extends into the tapered section 24. Pressed into the second section of the hole in the pipe 23 is an inner pipe 27, which extends through the centre in the first section 26 of the hole in the pipe 23. At its lower end, the pipe 23 is secured in a supporting part 28, which is also included in the first telescopic part. Also the inner pipe 27 is inserted and sealed in the supporting part 28, which is rotatably supported on the journal 7. Arranged so that it can be fastened on the supporting part is a unit 29, shown in FIG. 5a–5c, which integrated supports the blocking valve 12a, 12b and the pressure distribution valve 13 for the elevating cylinder in question. The supporting part 28 is made in the form of a first connection hole 30 which connects the first blocking valve element 12a with the through hole 31 of the inner pipe 27 and a second connection hole 32 which connects the second blocking valve element 12b with the hole section 26 in the pipe 23.

At its other end, at about the central parts of the tapered section 24, a fixed piston part 33 is fastened, which together with a so-called floating piston part 34 is included in the above-mentioned piston unit which is allotted to the first telescopic part. The floating piston part 34 is arranged so that it can be displaced in relation to the pipe 23, between end positions which are defined by the fixed piston part 33 and the shoulder 25. Fastening of the pipe 23 in the supporting part 28, and positioning the first piston on the pipe 23 can be achieved in various ways, and in the case shown it has been done by means of threads and a nut. The fixed piston part is moreover provided with at least one constriction 35a, via which hydraulic fluid can pass from the upper side of the floating piston to the upper side of the fixed piston, or vice versa. The fixed piston is also provided with what is here called a shock valve 35b, which in order to smoothen out damping characteristics achieved by the piston unit is arranged to open the passage between the upper side of the floating piston and the upper side of the fixed piston when the pressure at the first-mentioned side exceeds the value at the last-mentioned side by a predetermined value. The shock valve comprises a spring-loaded slide, which seals against a seat in the normal case, and which is pressed away in order to permit the passage of medium in the case when the pressure on the upper side of the floating piston exceeds the pressure at the upper side of the fixed piston by the predetermined value.

Also the second telescopic part (8 in FIG. 1) comprises a pipe, which is here called the outer pipe 36, which is supported on the pipe 23 via said pistons 33 and 34, and a cylinder end 37 allotted to it and arranged at its lower end. At the upper parts of the outer pipe 36, space is provided for a compensation piston 38, which is kept pressed in the direction towards the fluid space U3 by a strong spring. Normally, the piston 38 is kept pressed against an end part 43 by the hydraulic pressure. The compensation piston has a recess 40, against which the compensation piston can close around the free end of the tapered section 24 when the barrel is in the depressed position (position according to FIGS. 3a, 3b) or a substantially depressed position. The compensation piston is supported in a sleeve 41, which can be screwed to the inner wall of the outer pipe at the free ends of the outer pipe. The compensation piston is then made in the form of an outwardly directed flange 42, which through coaction with a shoulder on the sleeve 41 defines one longitudinal displacement position of the compensation piston. The other longitudinal displacement position of the compensation piston is defined through the coaction of the flange 42 with an end surface of the end part 43 which is fastened in the sleeve. In the depressed position, the compensation piston 38 will be in mechanical contact with the fixed piston 33.

At its free end, the tapered section 24 is provided with a number of holes 44 located along the longitudinal direction of the section in a way which is known in itself, which through coaction with a wall section in the recess 40 in the compensation piston are included in a so-called end position damping device.

On the outer pipe 36, there is also arranged a support comprising a spherical bearing 45, contained in a bearing housing 46. A dust protecting device 47 is also applied at the bearing, to prevent dirt from entering into the support 9.

The components described above are sealed in relation to each other with seals of various kinds, and which can be of designs which are known in themselves. The sleeve 41 can be secured to the outer pipe 36 by means of threads or the like. FIGS. 3a and 3b show the completely telescoped position of the telescopic first and second parts of the elevating cylinder. At elevation, the outer pipe is actuated in the direction shown by the arrow 48.

At said piston unit with the fixed piston 33 and the floating piston 34, under the floating piston, a space U1 is formed. Between the fixed and the floating piston, a variable space U2 is obtained, and the maximum volume of the variable space is shown in FIGS. 3a and 3b. In principle, the minimum volume can be nothing at all, which would occur if the floating piston should come into contact with the under side of the fixed piston, but which last-mentioned case, however, it is here assumed will not occur. A third space U3 is formed on the upper side of the fixed piston.

The space U3 is connected with the operating pressure obtained from the control valve via inter alia the open blocking valve element 12a, the connection hole 20 and the through hole 31 in the inner pipe 27. In the depressed position of the barrel, the passage will also comprise a remaining slot between the bottom surface of the recess 40 of the compensation piston and the end surface of the tapered section 24, an eccentric hole 49 extending from the end surface of the tapered section and into the material of the tapered section in the longitudinal direction of the section, and one or several of the holes 44 for the end position damping device, which extends from the eccentric hole 49 through the material and out to the envelope surface of the tapered section. On the other hand, when the tapered section 24 is away from the recess 40, the medium in question obtains direct contact with the upper side of the first piston and via said constriction 35 with the upper side of the floating piston. The compensation piston is thus included in the end position damping device.

The space U1 is in contact with the distribution valve via the opened control valve element 12b, the hole connection 32 and the hole section 26 in the pipe 23 and a passage 50 at the inner end of the hole section 26.

Due to the unbalance in the suspension of the barrel, the pressure level of the medium present in the spaces U2 and U3 will vary in dependence on the angle of elevation of the barrel, with the pressure being approx. 25 bar at the maximum angle of elevation, and approx. 50 bar at an angle of 0°, if the medium column on which the barrel rests carries approx. 4.5 tons. On the under side of the floating piston, the pressure is kept by the pressure distribution valve for a value which at a stationary barrel and depression of the barrel is approx. ⅛ of the pressure on the upper side and for elevation movements of the barrel between ⅛ and 1/1 of the pressure on the upper side. When firing with open blocking valves, the pressure distribution function is closed entirely, possibly except at the lowest angles of elevation.

The arrangement with inter alia the fixed and the floating piston gives good damping properties for jumping movements upwards of the barrel in connection with firing with closed blocking valves. When a round is fired, the barrel is lifted upwards and the enclosed hydraulic fluid in the space U1 presses the floating piston upwards. The hydraulic fluid in the space U2 is pressed through the constriction 35 to the space U3, whereby a damping force directed against the direction of movement is obtained. The shock valve 35b sometimes enters into function also, and then limits the damping force to a certain desired adjustable level. When the kinetic energy has been consumed, the barrel falls back, and damping takes place in the opposite direction, until the floating piston has resumed its original position against the shoulder 25 in the pipe 23. The compensation piston equalizes the change in volume in the space U3, and thereby protects against under-pressure, so that there will be no air release in the fluid. The space U2 can thus be regarded as a damping volume.

When the barrel is in the clamped position, the arrangement shown also prevents stresses from arising due to variations in temperature. When the barrel is to be clamped, it is depressed with open control valves to a support utilized for the barrel. As the column of medium is connected with the drain pipe to the tank via the control valves, the pressure relief will take place with the aid of the compensation piston with the piston pressing out fluid into the tank, which involves that there will be no pressure in the system before the control and blocking valves are closed. The compensation valve is kept pressed out by its spring 39. At an increase in temperature, the remaining fluid expands. The floating piston part 34 and the compensation piston 38 take up the change in volume, and prevent any forces from being transferred from the cylinders to the clamping device, and forces from being transferred from one cylinder to the other. The clamping position is approx. 5° higher than the position shown in FIGS. 3a and 3b.

When the barrel is in its fully elevated position, the cylinder end 37 is in contact with the floating piston 34 so that in attempting to reach elevative position beyond the maximum elevation position, it will lift the floating piston 34 from the shoulder 25. This lifting involves that the active area of the lifting force is reduced by the area of the floating piston, and has only a value as the projected area of the diameter of the tapered section which is then chosen in such a way that the barrel cannot be held with said projected area, but the barrel will strive to sink back until the floating piston again rests against its shoulder. In this way, the barrel can be run with the full elevating velocity to the fully elevated position, and an efficient braking down function is obtained, which is built into the arrangement shown.

Figure 4:
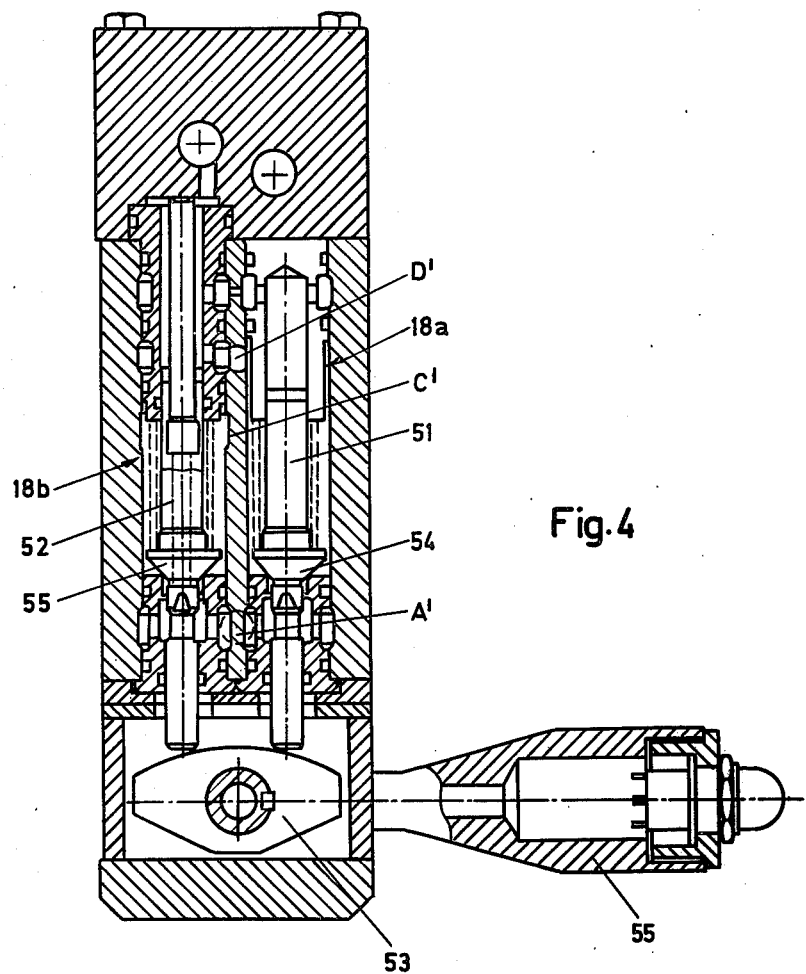
FIG. 4 shows a detailed cross-section view of a control valve of the type included in the components shown in FIG. 2, and FIGS. 5a–5c show a unit in various sections which can be applied to the elevating cylinder formed according to FIGS. 3a and 3b and comprising a blocking valve and a pressure distribution valve.

The control valves for the elevation and traversing control are built up identically. As shown in FIG. 4, which is intended to show the control valve for the elevation, the respective control valve comprises two valve spindles 51 and 52 and an eccentric cam 53. Each valve spindle is combined with a seat valve 54 and 55, respectively, and the eccentric curve is arranged so that it can be turned by means of an operating handle 55.

The control valve also has an inlet connection C', for the system pressure, which for instance can assume a value of 110 bar, a connection A' which is connected to the connection point A in e.g. FIG. 2 and an outlet connection D', which is connected to the tank for the hydraulic system.

During actuation (lifting) of the valve spindle 52 and its seat valve 55, a connection is obtained between the connections C' and A' which is dependent on the amount of the actuation. The greater the actuation, the more fluid is fed in over to the connection A' from the connection C', whereby the aiming velocity is determined by means of the control valve. At the actuation of the valve spindle 52 and the seat valve 55, the valve spindle 51 and its seat valve 54 are closed.

At the actuation of the valve spindle 51 and the seat valve 54 by means of the eccentric cam, the connection A' is connected to the connection D', and fluid will then be conducted from A' to D', involving a depression of the barrel. During this actuation of the valve spindle 51 and the seat valve 54 the valve spindle 52 and the seat valve 55 are unactuated. In the neutral position of the eccentric cam all pipes are thus kept closed by the seat valve, so that the barrel cannot drift when there should be no aiming movement of the barrel.

The operating valve 17 (according to FIG. 2) which is included in the operating unit 16 with the control valves can consist of a hydraulic three-way two-position valve of a known type, which is spring-loaded towards one position, and electrically (via an electromagnet) actuated to its other position.

The design of the blocking valve will be noted from FIG. 5a. The blocking valve elements 12a, 12b, each comprise a seat valve 56 which is actuated to its closed position by a spring 57. In FIG. 5, the connection for the operation of the blocking valve element is symbolized with B'', via which connection the operating pressure for the blocking valve is conveyed to a piston unit 58 which actuates a seat valve. At the connection of the operating pressure for the blocking valve, the piston unit 58 is pressed against the force of the spring 57, and the actuation of the seat valve towards the closed position ceases, and a connection 50 and 60, respectively is connected to the connection holes 30 and 32, respectively (FIG. 3a). When the operating pressure on the unit 58 disappears, the spring 57 will again close the seat valve 56. In FIG. 5a, the distribution valve is designated with the numeral 13.

In principle, the distribution valve 13 comprises two slide valves 13g and 13h which can be displaced longitudinally, as shown in FIG. 5b. The slide valves each work against its control edge 61 and 62, respectively. The slide valves are arranged with their ends in contact with each other, the slide valve 13g then being arranged in a fixed piston lining supporting the control edge 61 which, in turn, is arranged at one end of a recess in which the slide valve 13h is applied so that it can be displaced. The slide valve 13g has a piston area which can be ⅛ of the piston area of the slide valve 13h.

When stationary and at depression of the barrel, the slide valve 13g regulates against the control edge 61 and keeps the pressure on the under side of the piston 34 (FIG. 3b) substantially constant, and so that the pressure on the under side is approx. ⅛ of the pressure on the upper side. During depression of the barrel, fluid is fed from the connection A to the connection hole 32 (the connection channel 11) over said control edge 61. At the same time, hydraulic fluid on the upper side of the piston unit 33, 34 is returned to the tank.

During elevation of the barrel, fluid is fed from the inlet A to the connection hole 30 (connection channel 10) to the upper side of the piston unit 33, 34, and at the same time fluid is drained from the under side of the piston 34 to the drain pipe 14 (FIG. 5c), which takes place via the control edge 62 and the constriction 13e (FIG. 5c). The constriction 13e causes a velocity dependent added force to be obtained via a channel 13i on the side of the slide valve 13h which coacts with the slide valve 13g. The added force strives to close the valve against the drain pipe 14, whereby the pressure relation is changed in dependence on the elevating velocity, and at the highest elevating velocities approaches 1:1.

When firing, upward jumping movements are obtained in the barrel, which particularly at high angles of elevation will be of a magnitude whereby the added force assumes values which cause closing of the drain pipe 14. The piston unit 33, 34, can in this way carry out the damping function described above, even if firing takes place with open blocking valves.

The slide valves 13g and 13h work with long overlapping sections 13k and 13l, respectively, which prevent an undesirable flow of hydraulic fluid in the closing positions of the valves.

The length of stroke of the telescopic units is of the magnitude of 0.8 m.

The invention is not limited to the embodiment shown above as an example, but can be subject to modifications within the scope of the following claims.

We claim:

1. An apparatus for selectively elevating a barrel of an artillery type weapon, said apparatus comprising:
    a first cylinder member attached at a first end portion to said artillery weapon and a second cylinder member being rotatably attached to said barrel, with said first and second cylinders telescopically arranged relative to one another;
    a piston assembly including a fixed piston and a movable piston positioned within said telescoping cylinders, with a fluid medium selectively introduced through passages in said telescoping cylinders for contact with said piston assembly, causing relative displacement of said cylinders; and
    means formed in at least one fluid passageway extending through said piston assembly to control the flow of said fluid medium and provide a dampening force against movements of said barrel.

2. A device according to claim 1, wherein said first cylinder member is formed with a tapered second end portion engaging said first end portion and extending into said second cylinder member;
    said piston assembly being arranged on said first cylinder member with said fixed piston positioned adjacent a free end of said second end portion and said movable piston being positioned on said second end portion adjacent a shoulder joining said first and second end portions of said cylinder, whereby said movable piston rests against said shoulder when said barrel assumes an elevated position relative to the artillery weapon.

3. A device according to claim 2, wherein a further piston assembly is positioned adjacent said fixed piston on a side opposite from said movable piston,
    with a spring assembly positioned within said telescoping cylinders forcing said further piston toward said fixed piston to prevent air release into the fluid medium during selective movements of said barrel.

4. A device according to claim 3, wherein said further piston comprises a compensation piston which relieves fluid pressure within said telescoping cylinder by pressing said fluid through fluid passageways into a reservoir tank, thereby allowing said barrel to be lowered.

5. A device according to claim 1, wherein a lower piston assembly is attached to a second end of said second cylinder member, with said lower piston assembly surrounding said first telescoping cylinder and contacting said movable piston when said barrel assumes a maximum elevation.

6. A device according to claim 5, wherein said telescoping cylinders include area means for temporarily raising said barrel above a maximum firing elevation as may occur during firing operation of said weapon.

7. A device according to claim 6, wherein said area means comprises spacing said fixed and movable pistons from one another about said first cylinder member by a specified distance to allow said second cylinder to move until said fixed and movable pistons contact one another.

8. A device according to claim 1, wherein said means comprises forming a restrictive flow path through said fixed piston to restrict the flow rate through said fixed piston to dampen movements of said barrel.

9. A device according to claim 8, wherein said means comprises a shock valve formed in a fluid passageway extending through said fixed valve to restrict the flow rate through said fixed piston to dampen movements of said barrel.

* * * * *

UNITED STATES PATENT AND TRADEMARK OFFICE
CERTIFICATE OF CORRECTION

PATENT NO. : 4,158,324

DATED : June 19, 1979

INVENTOR(S) : Gustav H. Tidemalm and Bjorn E. Vidinghoff

It is certified that error appears in the above-identified patent and that said Letters Patent are hereby corrected as shown below:

FOREIGN APPLICATION PRIORITY DATA

July 5, 1976      Sweden..................7607652

Signed and Sealed this

Twentieth Day of November 1979

[SEAL]

Attest:

RUTH C. MASON
Attesting Officer

LUTRELLE F. PARKER
Acting Commissioner of Patents and Trademarks